United States Patent
Kiener et al.

(10) Patent No.: US 9,447,719 B2
(45) Date of Patent: Sep. 20, 2016

(54) RADIATOR SHUTTER

(71) Applicant: KUNSTSTOFF SCHWANDEN AG, Schwanden (CH)

(72) Inventors: Albert Kiener, Mollis (CH); Josef Kuesperth, Schwanden (CH)

(73) Assignee: KUNSTSTOFF SCHWANDEN AG, Schwanden (CH)

( * ) Notice: Subject to any disclaimer, the term of this patent is extended or adjusted under 35 U.S.C. 154(b) by 681 days.

(21) Appl. No.: 13/872,704

(22) Filed: Apr. 29, 2013

(65) Prior Publication Data

US 2013/0284401 A1    Oct. 31, 2013

(30) Foreign Application Priority Data

Apr. 30, 2012 (CH) .......................... 594/12

(51) Int. Cl.
| | |
|---|---|
| *F01P 7/02* | (2006.01) |
| *F28F 27/02* | (2006.01) |
| *B60K 11/08* | (2006.01) |

(52) U.S. Cl.
CPC .............. *F01P 7/02* (2013.01); *B60K 11/085* (2013.01); *F28F 27/02* (2013.01)

(58) Field of Classification Search
CPC ..... B60K 11/085; B60K 11/04; B60K 11/08; B60R 19/52; B60R 2019/525; F01P 7/00; F01P 7/02; F28F 27/02
USPC ..................................................... 165/98, 99
See application file for complete search history.

(56) References Cited

U.S. PATENT DOCUMENTS

| | | | | | |
|---|---|---|---|---|---|
| 1,393,917 | A | * | 10/1921 | Snell ........................ | F01P 7/10 123/41.05 |
| 3,500,739 | A | * | 3/1970 | Dry ......................... | F24F 13/15 454/318 |
| 2010/0139583 | A1 | * | 6/2010 | Klotz ................... | B60K 11/085 123/41.04 |
| 2010/0243352 | A1 | * | 9/2010 | Watanabe ............ | B60K 11/085 180/68.1 |
| 2012/0019025 | A1 | * | 1/2012 | Evans .................. | B60K 11/085 296/193.1 |
| 2012/0110909 | A1 | * | 5/2012 | Crane ................... | B60K 11/085 49/70 |

FOREIGN PATENT DOCUMENTS

| | | |
|---|---|---|
| DE | 10 2008 049 010 A | 4/2010 |
| JP | 60203522 A * | 10/1985 |

OTHER PUBLICATIONS espacenet English abstract of DE 10 2008 049 010 Al.

* cited by examiner

*Primary Examiner* — Tho V Duong
(74) *Attorney, Agent, or Firm* — Ladas & Parry LLP

(57) ABSTRACT

A radiator shutter provided for the frontal arrangement at a motor vehicle shows two groups of lamellae, which are pivotally supported at opposite sides of a drive unit, each parallel in reference to a shutter frame. For a joint pivoting of the lamellae an entrainer tappet provided here at a distance from its bearing axis in the direction perpendicular in reference to the longitudinal direction of the lamellae, engages a common coupling element. For a simple production of the engagement of the bearing tappets of the lamellae in the shutter frame and its entrainer tappets in the coupling element they are latched in bearing recesses open perpendicular in reference to the bearing axis.

15 Claims, 5 Drawing Sheets

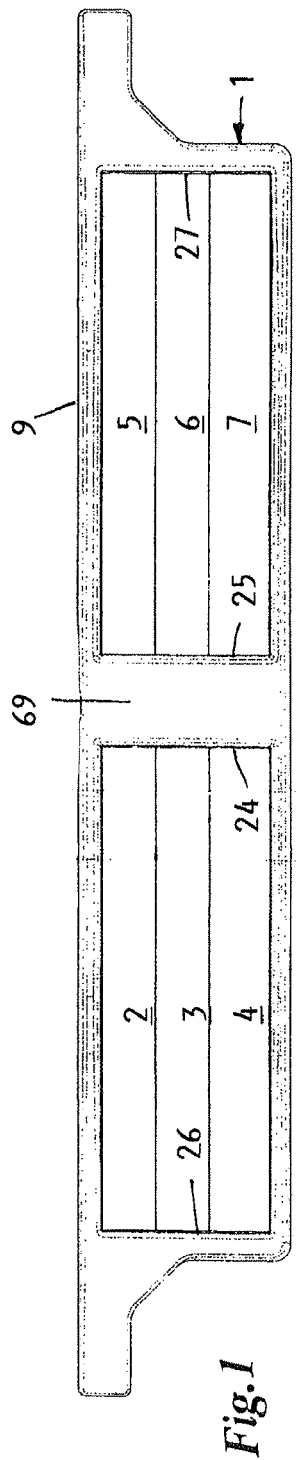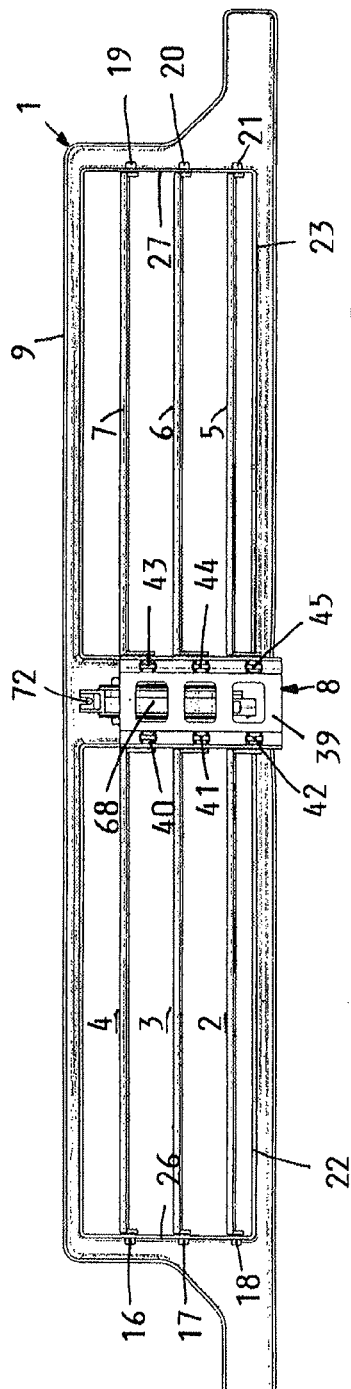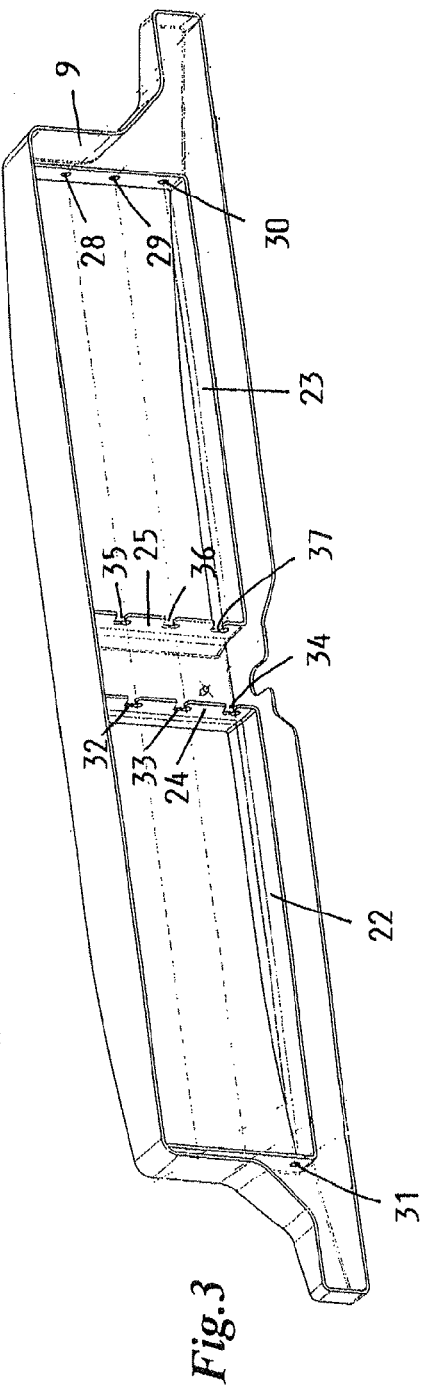

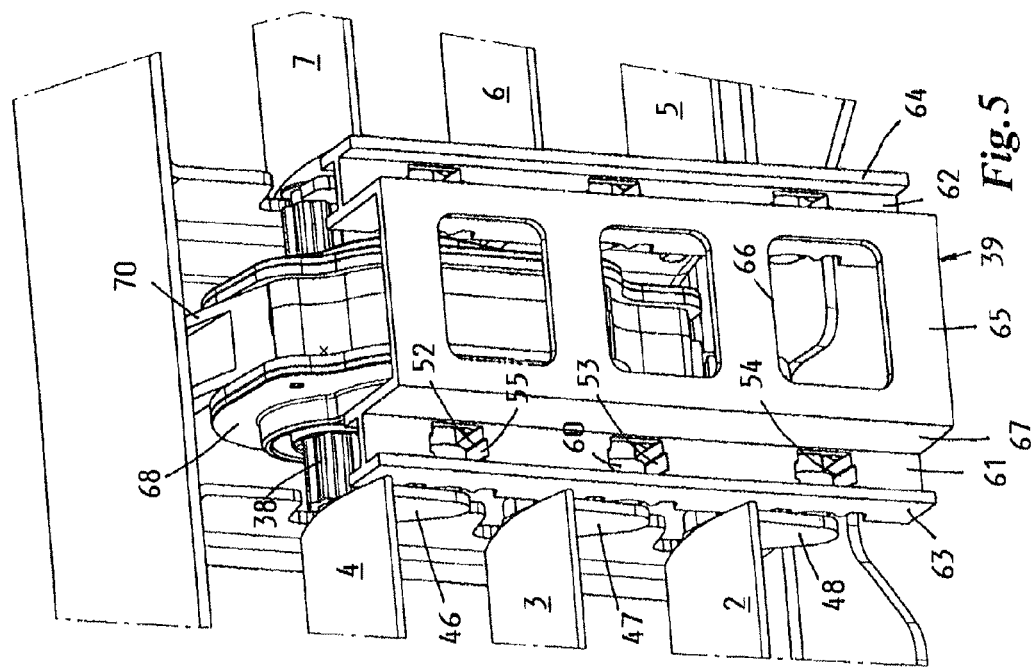
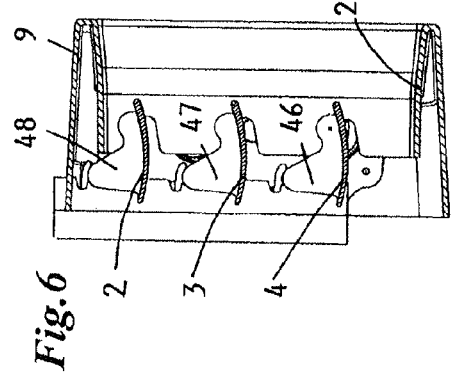
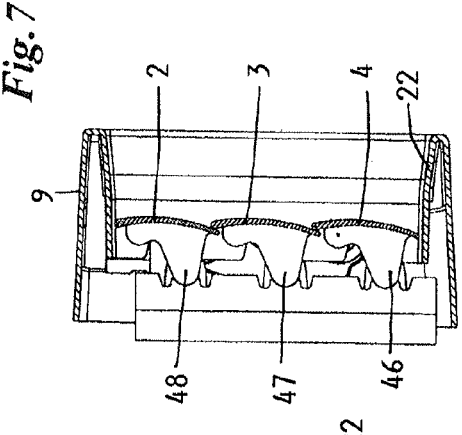
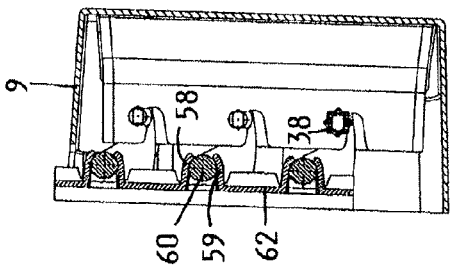
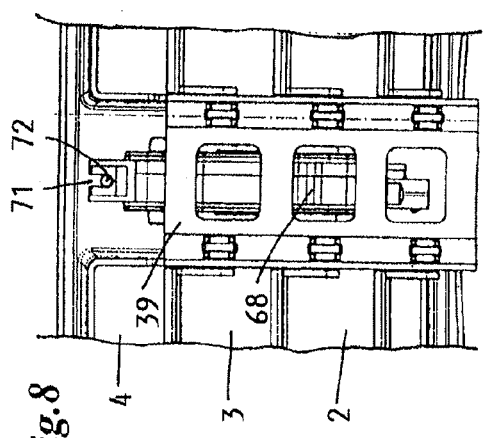

RADIATOR SHUTTER

BACKGROUND OF THE INVENTION

1. Field of the Invention

The invention relates to a shutter for the arrangement in front of the radiator of a motor vehicle, with its one-piece lamellae, formed linearly via plastic injection molding technology, each being pivotally arranged in two groups parallel in reference to each other on opposite sides of an actuator in a shutter frame, with at these lamellae as well as at each lamella parallel thereto one entrainer being provided both at each matching parallel lamella at a distance from its pivotal axis in the direction perpendicular in reference to the longitudinal direction of the lamella, which engages a coupling element connecting the parallel lamellae with each other such that it transfers an adjustment motion triggered by the actuator to at least one other lamella parallel thereto.

Such shutters are mounted at the front of a vehicle so that its engine compartment can be tightly sealed in a closed position of the lamellae of the shutter, the cw-value is improved, and the engine faster reaches its operating temperature.

2. Description of Related Art

A radiator shutter of this type is known per se from DE102008049010. Its centrally arranged actuator serves for an opposite pivotal motion of groups of lamellae arranged over top of each other. In order to pivot several lamellae arranged parallel in reference to each other in the same direction each of them comprises a central entraining tappet at a distance from its pivotal axis, which is connected to a common coupling element. The pivotal drive occurs here by the direct coupling of the rotary axis of one of the lamellae to the driven shaft of a pecker motor.

One advantage of this design is given in the space-saving, central arrangement of the actuator inside the shutter frame as well as the consequently symmetric distribution of the actuating force of the actuator to relatively short lamellae, which therefore can be subjected to higher bending and torsion forces. Such forces develop not only by the compression at the vehicle front or by the influence of impacting foreign objects, but also by the actuating force of the actuator when some lamellae are sluggish due to soiling or have to be broken loose after being frozen shut.

The assembly of the plurality of parts to form shutters of prior art is expensive, though, and hardly suitable for automation because both the support of the lamellae as well as their connection to a coupling element transmitting the pivotal motion requires the production of numerous engagements with bearings which must be performed such that the lamellae on the one side are held with sufficient reliability and on the other side are easily and securely pivotal.

BRIEF SUMMARY OF THE INVENTION

The invention is based on the objective to find a radiator shutter of the type mentioned at the outset with its numerous individual parts, produced via plastic injection molding, can be assembled with little technical expense to form a shutter with highly reliable functionality.

This objective is attained according to the invention such that at least the bearing tappets of one of the ends of a lamella are inserted in bearing recesses of a lateral wall of the shutter frame, open perpendicular in reference to the axis of the bearings.

Advantageous embodiments of the invention are the subject of the dependent claims and are to be inferred from the following description with the aid of the exemplary embodiments shown in the drawings.

BRIEF DESCRIPTION OF THE SEVERAL VIEWS OF THE DRAWINGS

It shows:

FIG. 1 a front view of an entire shutter with two groups of three lamellae parallel in reference to each other and arranged symmetrically in their position sealing the shutter, FIG. 2 the rear of the shutter according to FIG. 1 with its lamellae in the closed position, FIG. 3 a perspective view of the shutter frame of the shutter according to FIG. 1 and FIG. 2, FIG. 4 a detail of the shutter as an exploded illustration of its components prior to its assembly, FIG. 5 an enlarged perspective illustration of the adjustment mechanism of the lamellae with the actuator and a coupling element, FIG. 6 a cross-section through the shutter according to FIG. 1 in the completely open position of the lamellae, FIG. 7 an illustration according to FIG. 6 with the lamellae in the closed position, FIG. 8 a cross-section through the shutter according to FIG. 1 in the level intersecting the entraining tappets of the lamellae, FIG. 9 a front view of the adjustment mechanism of the lamellae with the actuator and a coupling element, FIG. 10 a second exemplary embodiment of the invention in a detailed depiction of the shutter in the form of an exploded illustration, with its components (shown) prior to their assembly, FIG. 11 an enlarged perspective illustration of the adjustment mechanism of the lamellae of the shutter according to FIG. 10, with the actuator and a coupling element, in the open position of the lamellae, and FIG. 12 an illustration according to FIG. 11 with the lamellae in the closed position.

DETAILED DESCRIPTION OF THE PREFERRED EMBODIMENTS

The shutter 1 intended to be arranged in an opening in the chassis of the front of a vehicle is determined with regards to its shape and dimensions by the design of the respective vehicle. For example, six lamellae 2-7 of the shutter 1 are pivotally supported in two groups of three lamellae 2-4 and 5-7 each on opposite sides of an actuator 8, parallel in reference to each other, in a common shutter frame 9.

Figure 4:
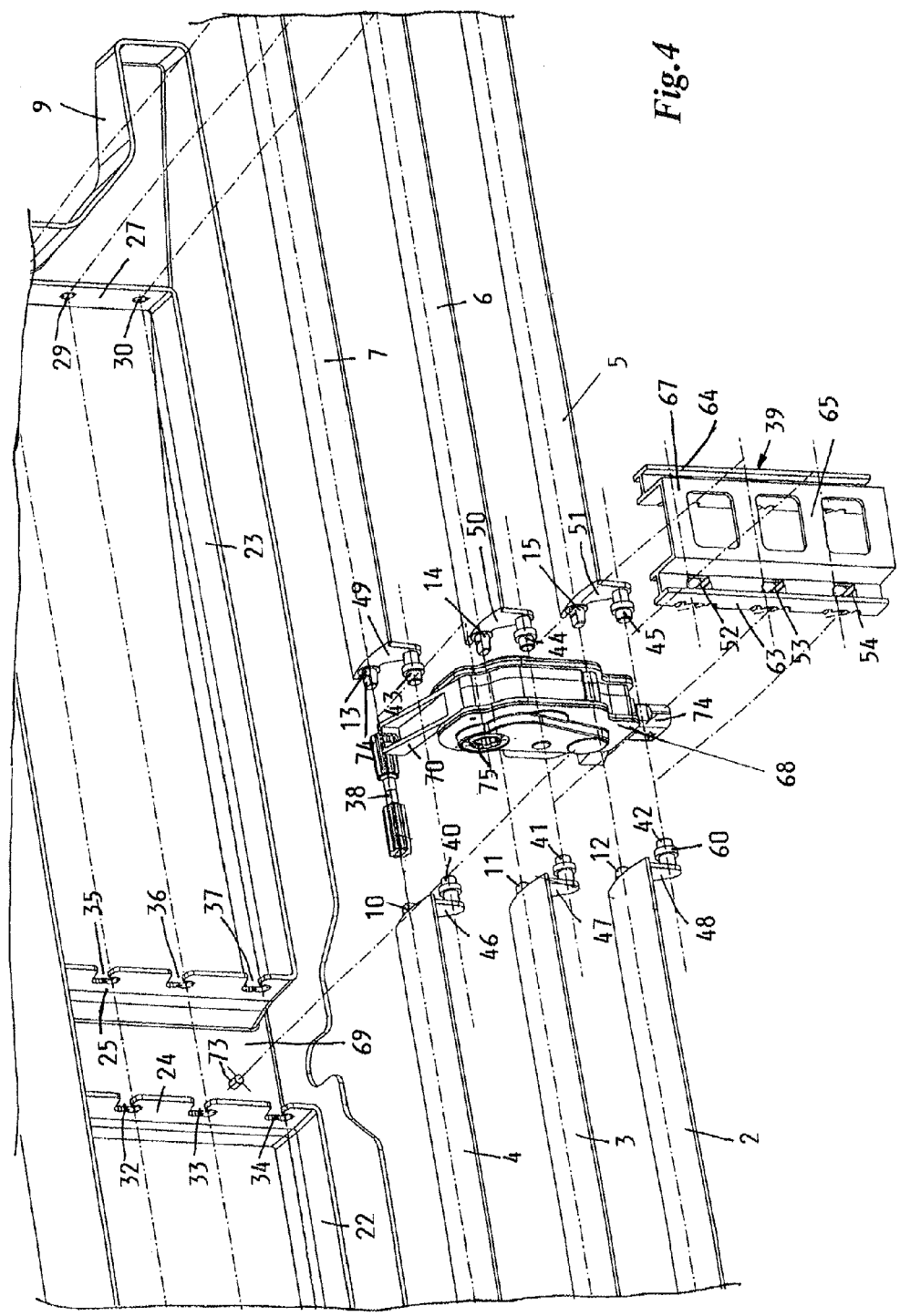
Figure 10:
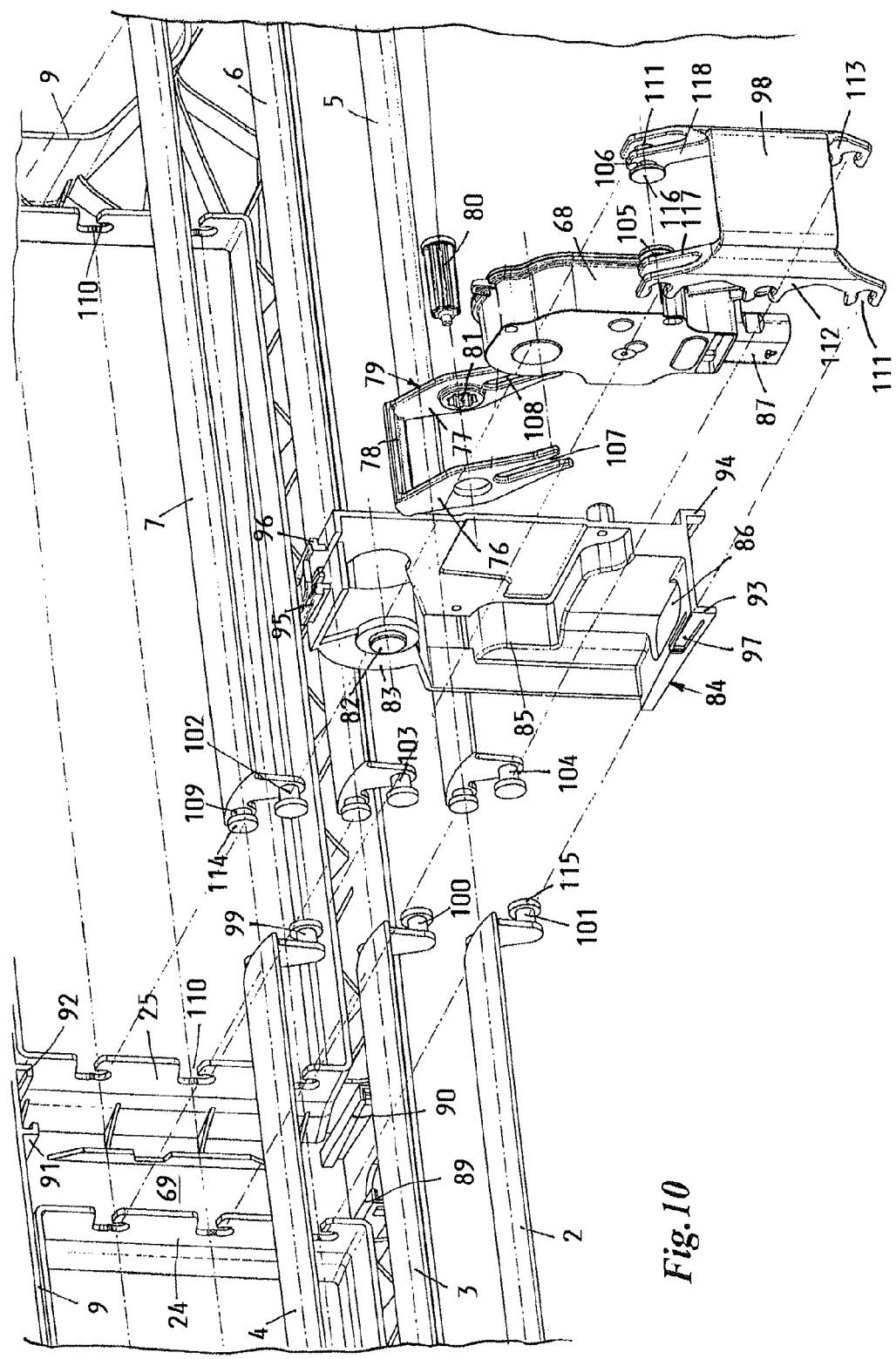
Figure 12:
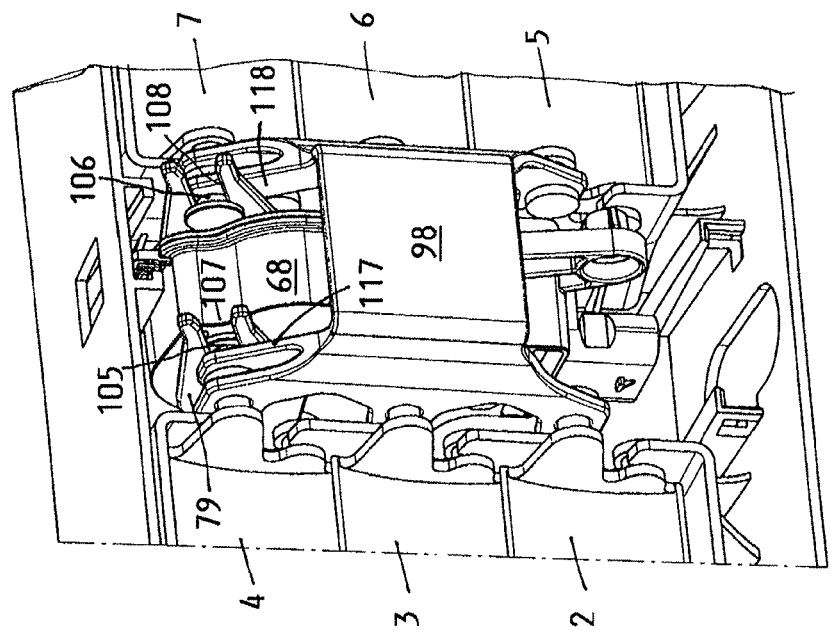
Figure 11:
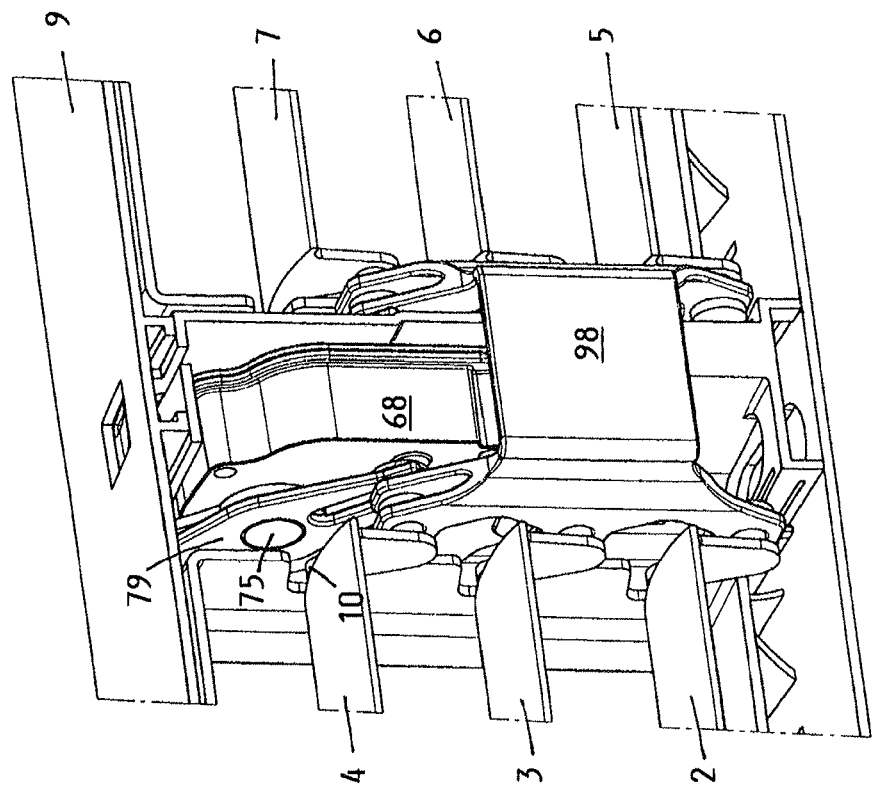

In order to support axially internal bearing tappets 10-15, shown in FIG. 4, and axially external bearing tappets 16-21, shown in FIG. 2, of the lamellae 2-7 the shutter frame 9 shows for both groups of lamellae 2-4 and 5-7 each an internal frame 22 and 23 formed thereat in one piece.

The internal side walls 24, 25 parallel in reference to each other, and the external side walls 26, 27 of these internal frames 22, 22 serve for the pivotal support of the lamellae 2-7. For this purpose, bearing holes 28-31 are provided in the external lateral walls 26, 27 of the internal frames 22, 23 for inserting the axially external bearing tappets 16-21. However, in the internal side walls 24, 25, in the direction perpendicular in reference to the bearing tappets, open bearing recesses 32-37 are provided, angled downwards, for the internal bearing tappets 10-15 of the lamellae 2-7 so that the lamellae 2-7 can easily be inserted into the shutter frame 9.

In order to perform a pivotal motion of all lamellae 2-7, according to a first exemplary embodiment of the invention, the axially internal bearing tappets 10, 13 of the upper coaxial lamellae 2, 5 are directly coupled to the drive shaft 38 of the actuator 8 and the transmission of this pivotal motion to the other lamellae 3, 4, and 6, 7 occurs via a preferably common coupling element 39. This coupling element 39 is respectively engaged by entrainer tappets 40-45 of the lamellae 2-7 which are provided at a distance from their bearing tappets 10-15 at the lamellae 2-7 forming the pivoting lever. The pivoting levers 46-51 provided for this purpose at each lamella 2-7 is shaped, e.g., in the form of a short lateral wall at the internal ends of the lamellae 2-7. Additional similar lateral walls may be provided to reinforce the lamellae.

In order for the entraining tappets 40-45 to engage the coupling element 39 tappet accepts 52-54 are provided thereat at the appropriate position. These tappet accepts 52-54 are formed, e.g., according to the illustration in FIG. 8 each by a pair of fastening claws 58, 59 arranged over top of each other with internal bearing grooves 55, between which the entraining tappets 40-46 latch with a tappet hub 60 provided for that purpose via an assembly motion of the coupling element 39 performed in the direction of the shutter frame 9.

The tappet accepts 52-54 of the coupling element 39 are provided for example in the lateral wall 61, 62 of a lateral profile 63, 64, in its cross-section U-shaped or double-T shaped, with these lateral profiles being connected to each other in one piece by a common rear wall 65 of the coupling element 39. Here, this rear wall 65 of the coupling element 39, e.g., showing material-saving recesses 66, forms together with the internal legs 67 of the lateral profiles 63, 64 a U-profile encompassing the drive unit 68 of the actuator 8 such that the shutter 1 including its actuator 8 formed by the drive unit 68 and its coupling element 39 can be assembled in front of the engine compartment of a vehicle in a space-saving fashion.

As discernible from the illustration in FIG. 9, in order to insert and fasten the drive unit 68 of the actuator 8 in a central position at the shutter frame 9, a fastening arm 70 is provided aligned to the central front wall 69 of the shutter frame 9, which encompasses with a u-shaped recess 71 at the end a fastening tappet 72 formed at the shutter frame 9. The section of the drive unit 68 opposite the lamellae and in the perpendicular direction in reference thereto is connected thereto via a second fastening tappet 73 formed at the shutter frame 9. After the placement of the drive unit 68 onto said fastening tappets 72, 73 a mushroom-shaped tappet head may be formed at the external end by way of thermal deformation.

The drive unit 68 of the actuator 8 shows a particularly narrow design by a pecker motor, not shown and enclosed therein, supplied via an electric connection socket 74, being arranged in the same level with several sprockets in order to drive the lamellae drive shaft 38 comprising external gears via an annulus 75, showing internal gears at the end, with a high torque and low rotation.

For the coupling of the drive shaft 38 of the lamellae to the internal bearing tappet 10, 13 of the upper, coaxial pair of lamellae 2, 5 these bearing tappets 10, 13 show flattened or non-round external ends 74, which respectively engage entry openings formed hollow with a corresponding contour at the two external ends of the drive shaft 38 of the lamellae.

Although at the other lamellae 3, 4, and 6, 7 such an engagement profiling (74) of the internal bearing tappets 11, 12 and 14, 15 has no function, for reasons of simplification of the production all lamellae of a group of lamellae 2-4 and 5-7 were formed identical.

The second exemplary embodiment of the invention according to the illustrations of FIGS. 10 through 13 differ from the above-described one essentially such that the drive shaft 75 of the drive unit 68 of the actuator 8, instead of acting upon a bearing tappet 10, 13 of a lamellae, being coupled to two flat drive levers 76, 77 extending at both sides of the drive unit 68, parallel to their planar lateral walls. Here, these two parallel drive levers 76, 77 aligned towards each other are preferably connected fixed to each other via a lateral bar 78 to a drive bar 79 encompassing the drive unit 68.

The execution of the pivotal motion of the drive bar 79 by a pecker motor of the drive unit 68 upon the drive bar 79 occurs via a drive shaft 80, showing external gears, engaging on the one side the internal gears 81 of one of the drive levers 77 and on the other side the internal gears of the driven shaft of the drive unit 68.

The stable support of the drive bar 79 at both sides occurs for example on the one side via the drive shaft 80 and on the other side via a short bearing tappet 82, which is formed at a short lateral wall 83 of an adapter housing 84 encompassed by the drive bar 79.

The adapter housing 84 shows an internal contour 85, which accepts the housing of the drive unit 68 in a form-fitting fashion. Here, the bottom opening 86 of the adapter housing 84 serves to accept the electric connection socket 87 of the drive unit 68. Coaxial in reference to the formed bearing tappet 82 for the drive bar 79 on the opposite side of the adapter housing 84 an opening 88 is provided for a penetrating guidance of the drive shaft 80.

The adapter housing 84 is fastened at the shutter frame 9 in the proximity of the central front wall 69. Here, lower and upper accepting bars 89, 90, and 91, 92 formed at the shutter frame 9 as well as guide bars 93, 94, and 95, 96, formed at the adapter housing 84 and engaging them serve for this purpose. Latches 97 provided laterally at the guide bars 93, 94 serve, after latching in the accepting bars 89, 90, to the secure fastening of the adapter housing 84 and thus also the drive unit 68 and the coupled lamellae 2-7 at the shutter frame 9.

Again in this second exemplary embodiment of the invention a coupling element 98 is provided for the joint pivoting of the lamellae 2-7, which is engaged by the entrainer tappets 99-104, however in this case the adjusting motion of the coupling element 98 occurs via the drive lever 76, 77, acting upon the coupling tappets 105, 106 formed at the inside of the coupling element 98. For this purpose, the drive lever 76, 77 show one guiding slot 107, 108 each, similar to a crank drive, engaged by the coupling tappets 105, 106 of the coupling element 98 and which can glide along it during the actuating motion.

The use of such a forked drive lever 76, in addition to an advantageous kinematic of the drive transfer, also shows the advantage of a simplified assembly of the coupling element 83 by it simply being pushed onto and latched on the entrainer tappets 99-104 of the lamellae 2-7.

The easily produced fixation of the coupling element 83 at the entrainer tappet develops such that the width of the lateral openings 84 of the claw-shaped bearing recesses 85-88 is slightly smaller than the diameter of the bearing tappets 10-15 so that they can latch here by deforming the plastic material of the coupling element 83.

For the axial securing of the engagement of the bearing tappets 109 of the lamellae 2-7, latching in the same fashion, in downwards angular bearing recesses 110 of the internal lateral walls 24, 25 of the shutter frame 9 as well as the entrainer tappets 99-104 in claw-shaped recesses 111 of lateral bars 112, 113 of the coupling element 98, parallel in reference to each other, at these tappets 109 and 99-104 preferably at the end and thus shaped like mushroom-heads circumferential tappet hubs 114, 115 are provided.

In a similar fashion, the internal coupling tappets 105, 106 of the coupling element 98 are also secured in the guide slots 107, 108 of the drive levers 76, 77 against lateral displacement and unlatching by tappet hubs 116 at the end.

In order to allow providing coupling tappets 105, 106 coaxially engaging the guide slots 107, 108 of the drive bar 79 with the entraining tappets 99 and 104 and/or their claw-shaped recesses 111 of the coupling element, without these tappets being connected to each other, the upper section of the lateral legs 112, 113 of the coupling element 98 each shows an additional internal wall and is therefore embodied with two legs. The coupling tappets 105, 106 are each formed at the inside at the internal legs 117, 118 of the coupling element 98 formed here.

Both embodiments of a shutter according to the invention described have in common that the functionally cooperating parts can be produced cost-effectively in a plastic injection molding process and can be assembled to function correctly with relatively low expense in an automated assembly device such that with low adjustment resistance, even given the high stress caused by the arrangement in the front section of a vehicle, high functional safety is ensured.

The invention claimed is:

1. A shutter for the arrangement in front of a radiator of a motor vehicle, with its linear lamellae (2-7), formed in one piece in a plastic injection molding process being supported in two groups (2-4, 5-7) on opposite sides of an actuator (8), each linear lamella being parallel in reference to each other in a shutter frame (9) and pivotally supported at their ends to the shutter frame via bearing tappets (10-15), with an entrainer (40-45) being provided at inside ends of each group of lamellae (2-7) and each lamella parallel to each other (3, 4, 6, 7) at a distance from a pivotal axis of the lamella, perpendicular to the longitudinal direction of the lamellae, engaging a coupling element (39) connecting parallel lamellae with each other so that an adjustment motion triggered by an actuator (8) is transmitted to at least one lamella (3, 4, 6, 7) parallel thereto, wherein at least the bearing tappets (10-15) of one of the lamella ends are inserted into one of a plurality of bearing recesses (32-37) open perpendicular to a bearing axis in a lateral wall (24, 26) of the shutter frame (9), wherein the bearing recesses (32-37) are formed by wall recesses, angled downward, of a lateral wall (24, 26) of the shutter frame (9).

2. The shutter according to claim 1, wherein an opening width of the bearing recesses (32-37) is smaller than the diameter of the bearing tappets (10-15) so that they latch in the bearing recesses.

3. The shutter according to claim 1, wherein the bearing tappets (10-15, 16-21; 109) are encased on one side of the bearing tappets by the bearing recesses (32-37; 110) of an internal lateral wall (24, 25) and on the other side of the bearing tappets in a bearing hole (29, 30) of an external lateral wall (30) of the shutter frame (9).

4. The shutter according to claim 1, wherein the plurality of entrainers of the lamellae (2-7) are axially in parallel in reference to projecting, cylindrical entrainer tappets (40-45; 99-104), the entrainers being latched in the direction perpendicular in reference to the entrainer tappet (40-45) in tappet accepts (52-54; 111) of the coupling element (39) open at one side, with their opening width being smaller than the diameter of the latched entrainer tappets (40-45; 99-104).

5. The shutter according to claim 1, wherein one of two drive elements (38) is provided at each side of the actuator (8), each drive element (38) being in a drive connection with the bearing axis of two lamellae (4, 7) that are coaxial with each other.

6. The shutter according to claim 1, wherein a plurality of coupling elements (63, 64; 112, 113) of the two groups extend parallel with the lamellae (2-4, 5-7) arranged at both sides of the actuator (8) via a lateral wall (65) to a common coupling element (39, 98), connected to each other in one piece, so that the plurality of coupling elements (63, 64; 112, 113), the lateral wall (65), and the common coupling element (39, 98) together form a coupling frame (67, 98) showing U-shaped cross-section and encasing the drive unit (68) of the actuator (8).

7. The shutter according to claim 1, wherein each entrainer (40-45) is embodied cylindrically and latches to a tappet hub (60).

8. The shutter according to claim 1, wherein the lamellae of both groups of lamellae (2-4, 5-7) are supported in the lateral walls (24-27) of one each internal frame (22, 23) formed in one piece with the shutter frame (9), with the actuator (8) being arranged between the internal lateral walls (24, 25) of this internal frame (22, 23) and a drive unit (68) of the actuator (8) being fastened at the shutter frame (9).

9. The shutter according to claim 1, wherein the drive unit (68) of the actuator (8) is encased in an adapter housing (84) adjusted to its external counter, with counter guiding means (93-96) being provided for the purpose to engage guide means (89-92) formed at the shutter frame.

10. The shutter according to claim 1, wherein a drive shaft (80) of the drive unit (68) of the actuator (8) is coupled to at least one drive lever (76, 77) for the actuating motion of the coupling element (98).

11. The shutter according to claim 10, wherein at the coupling element (98) for each drive lever (76, 77) a coupling tappet (105, 106) is provided, which engages a crank-like guide slot (107, 108) of the drive lever (76, 77).

12. The shutter according to claim 6, wherein the coupling tappets (105, 106) are each formed at the inside of the internal legs (117, 118) of the coupling element (98).

13. The shutter according to claim 10, wherein two drive levers (76, 77) parallel in reference to each other are connected to each other via a lateral bar (78) to a drive bar (79) encasing the drive unit (68).

14. The shutter according to claim 13, wherein a drive lever (77) of the drive bar (79) engages a drive shaft (80) of a drive unit (68), the drive unit (68) is encased in an adapter housing (84), and the other drive lever (76) of the drive bar (79) is supported on a bearing tappet (82) provided at the adapter housing (84).

15. The shutter according to claim 1, wherein the drive unit (68) is encased in an adapter housing (84) and at this housing and the shutter frame (99) guide means (89, 90; 91, 92; 93-96) are provided for the mutual engagement, with certain latching means (97) being formed thereat for the mutual engagement.

* * * * *